United States Patent
Groβ et al.

(10) Patent No.: US 8,414,189 B2
(45) Date of Patent: Apr. 9, 2013

(54) GUIDE ELEMENT FOR CORRUGATED TUBES

(75) Inventors: Stefan Groβ, Trabitz (DE); Harald Neumann, Parkstein (DE); Frank Rosinus, Wolfen (DE)

(73) Assignee: Siemens Aktiengesellschaft, München (DE)

( * ) Notice: Subject to any disclaimer, the term of this patent is extended or adjusted under 35 U.S.C. 154(b) by 111 days.

(21) Appl. No.: 12/846,513

(22) Filed: Jul. 29, 2010

(65) Prior Publication Data
US 2011/0023266 A1 Feb. 3, 2011

(30) Foreign Application Priority Data

Aug. 3, 2009 (DE) .......................... 10 2009 035 950

(51) Int. Cl.
*F16C 29/04* (2006.01)
(52) U.S. Cl.
USPC .................................. 384/52; 384/50; 384/56
(58) Field of Classification Search .................... 384/29, 384/44, 45–46, 50–56, 49
See application file for complete search history.

(56) References Cited

U.S. PATENT DOCUMENTS

| | | | | |
|---|---|---|---|---|
| 1,946,177 A | * | 2/1934 | Neurath | 192/48.92 |
| 2,301,591 A | * | 11/1942 | Sutton | 235/79.5 |
| 2,907,610 A | * | 10/1959 | Wise | 384/55 |
| 3,353,876 A | * | 11/1967 | Moyer | 384/43 |
| 3,365,914 A | * | 1/1968 | Asher | 384/55 |
| 3,481,228 A | * | 12/1969 | Dickmann et al. | 81/57 |
| 3,582,161 A | * | 6/1971 | Hudson | 384/51 |
| 5,489,253 A | * | 2/1996 | Ito et al. | 384/52 |
| 6,378,816 B1 | * | 4/2002 | Pfister | 248/161 |
| 6,398,417 B1 | * | 6/2002 | Teramachi | 384/44 |
| 6,550,970 B2 | * | 4/2003 | Hirose | 384/50 |
| 6,557,433 B1 | * | 5/2003 | Castellon | 74/492 |
| 6,582,313 B2 | * | 6/2003 | Perrow | 464/145 |
| 6,802,781 B2 | * | 10/2004 | Schwarzler et al. | 384/49 |
| 7,174,803 B2 | * | 2/2007 | Reiche et al. | 74/493 |
| 7,328,993 B2 | * | 2/2008 | Van Soest et al. | 347/104 |
| 2002/0001419 A1 | * | 1/2002 | Nakajima | 384/49 |
| 2005/0180737 A1 | * | 8/2005 | Kurita et al. | 392/418 |
| 2009/0279814 A1 | * | 11/2009 | Yang | 384/44 |

FOREIGN PATENT DOCUMENTS

| | | |
|---|---|---|
| DE | 197 16 232 A1 | 5/1998 |
| DE | 201 13 742 U1 | 11/2001 |
| DE | 10 2005 053 030 A1 | 5/2007 |
| JP | 07176229 A * | 7/1995 |

OTHER PUBLICATIONS

German Office Action dated Apr. 15, 2010 for corresponding German Patent Application No. DE 10 2009 035 950.8, with English translation.

* cited by examiner

*Primary Examiner* — Marcus Charles
(74) *Attorney, Agent, or Firm* — Lempia Summerfield Katz LLC

(57) ABSTRACT

A guide element for a corrugated tube is formed as a ring. At least one rotating roller is integrated in the interior of the ring such that the at least one rotating roller contacts the corrugated tube when the corrugated tube is passed through the ring. The at least one rotating roller rotates with a movement of the corrugated tube using the guide element. The guide element enables low-wear control of corrugated tubes.

7 Claims, 3 Drawing Sheets

Prior Art

GUIDE ELEMENT FOR CORRUGATED TUBES

This application claims the benefit of DE 10 2009 035 950.8 filed Aug. 3, 2009, which is hereby incorporated by reference.

BACKGROUND

1. Field

The present embodiments relate to a guide element for corrugated tubes.

2. Description of Related Art

Grooved tubes are frequently used as tube sleeves, as described, for example, in DE 19716232 A1. As detailed in DE 19716232 A1, cable bundles and cable loops are placed in corrugated tubes. The corrugated tubes are configured as closed, enveloping tubes, for example. The walls of the corrugated tubes are configured as waves or grooves, for example.

These corrugated tubes may be configured such that the corrugated tubes effectively guide and provide good protection for cables guided therein. The surface structure of the corrugated tubes enables, as a result of the frictional properties, for example, clamping elements to be provided for the tube (e.g., with the aid of the corrugated surface, a certain friction of the tubes is achieved, in order to avoid hindrance as a result of sagging tubes).

To power complex systems (e.g. large medical devices), guide structures are provided for the corrugated tubes used. The guide structures affect targeted guidance of the tubes. Guide structures of this type are specified in DE 102005053030 B4 and the documents cited therein, for example.

SUMMARY AND DESCRIPTION

The present embodiments may obviate one or more of the drawbacks or limitations in the related art. For example, conventional guide structures for corrugated tubes may be improved.

The present embodiments are based on the observation that conventional guide structures may be configured for a low-wear guidance, in order to thus enable a long service life of the corrugated tubes.

In the present embodiments, a guide element for a corrugated tube that is improved in this respect is provided. The guide element is formed as a ring, through which the tube may be guided. At least one rotating roller (e.g., in the form of a cylinder) is integrated and/or arranged on the interior of the ring such that the rotating roller contacts the tube when the tube is passed through. The rotating roller rotates when the tube is moved using the guide element. In one embodiment, a plurality of rollers (e.g., 3-6) is arranged along a periphery of the interior of the guide element. The plurality of rollers may be arranged equidistantly along the periphery, for example.

The present embodiments are advantageous in that rolling friction occurs between the guide element and the tube, the rolling friction being associated with less wear than sliding friction, thus enabling a longer service life of the tube (and ultimately also the guide element). In one embodiment of the guide element, only the rollers come into contact with the tube (i.e., mostly rolling friction occurs).

Guide elements having a length of a few centimeters, for example, in the direction of guidance of the tube are currently used in applications in the field of medicine (cf. FIG. 1). The guide properties of guide elements of this type, for example, may be improved if a plurality of rows (e.g. 2 rows) of rollers (e.g. 3-6 rollers per row) is arranged along a periphery of the interior of the guide element. In one embodiment, the guide element includes two parallel rows, each row including 6 rollers (cf. FIG. 3) that form a circle on the interior of the guide element.

DETAILED DESCRIPTION OF THE DRAWINGS

Figure 1:
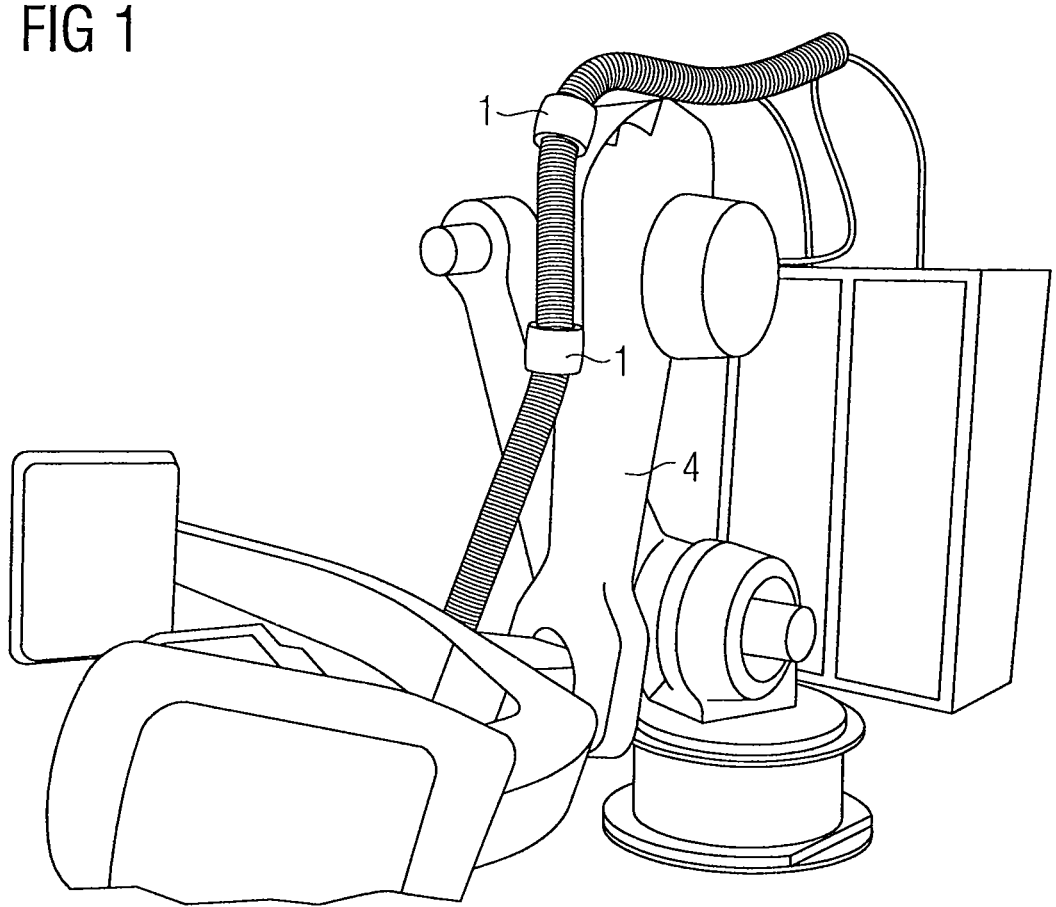
FIG. 1 shows a C-arm with a corrugated tube and a cable guide.

FIG. 1 shows a conventional C-arm 4. The C-arm 4 is powered by way of a cable, which is connected to a cable harness. The cable harness is protected by a corrugated tube 3 (e.g., with a surface made of PU or polyurethane). These corrugated tubes are guided in order to avoid collisions with shut-off strips and to avoid the forming of loops. Two guide elements 1, which are used for this purpose, are shown in FIG. 1.

Figure 2:
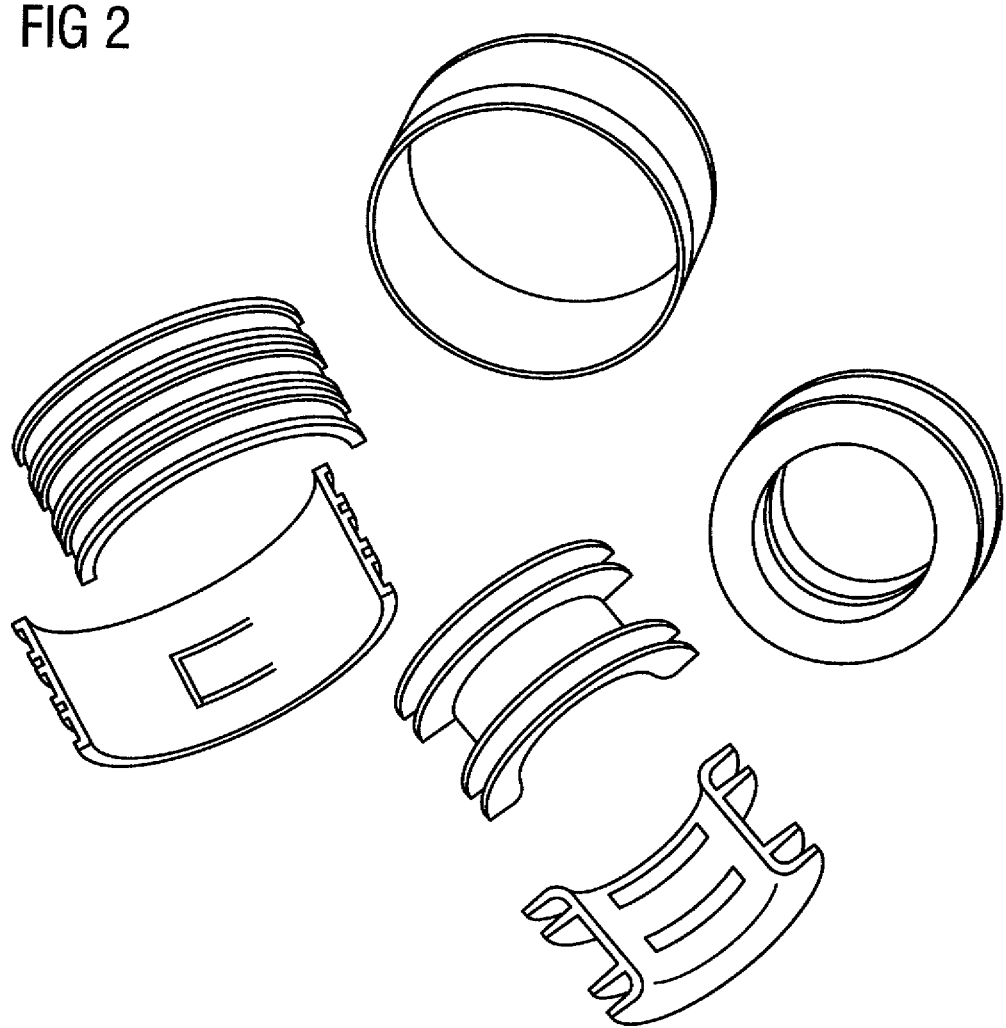
FIG. 2 shows conventional guide elements.

In conjunction with the use of large medical devices, these guide elements and/or ducts are realized using "sliding jaws/trumpets" made of plastic. Conventional guide elements by the company Reiku are shown in FIG. 2.

Relative movements occur between the corrugated tube and ducts in applications in the field of medicine as a result of movements of medical devices (e.g., a C-arc). Therefore, the use of conventional guide elements for guiding corrugated tubes results in a high sliding friction between the guide element and tube, thereby causing considerable wear (e.g., on the corrugated tube).

To prevent this friction and wear, guide elements and/or ducts of the present embodiments are used.

Figure 3:
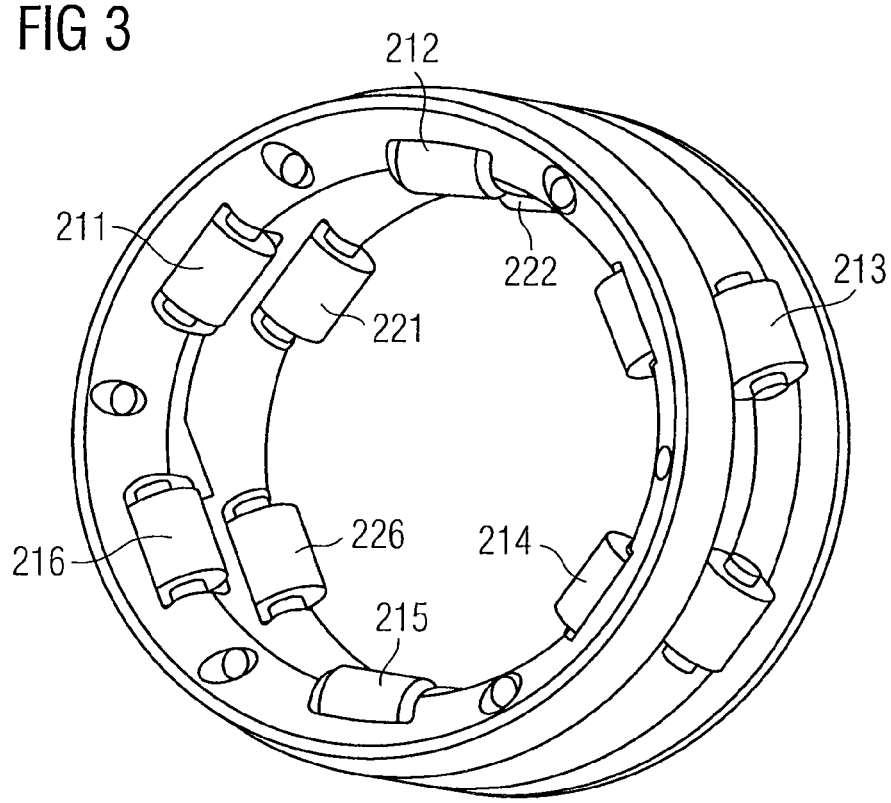
FIG. 3 shows one embodiment of a guide element.

FIG. 3 shows one embodiment of a guide element 1. The guide element 1 includes a first row of rollers 211, 212, 213, 214, 215 to 216 and/or a second row of rollers 221, 222, 223, 224, 225 and 226 (e.g., a plurality of rollers 211 to 216 and/or 221-226). The rollers of the second row are partially concealed in FIG. 3. The friction is thus reduced (rolling friction instead of sliding friction), and the wear is consequently reduced. The service life of the corrugated tube is also increased. The two-row embodiment provides the necessary guide length when guiding the tube.

Figure 4:
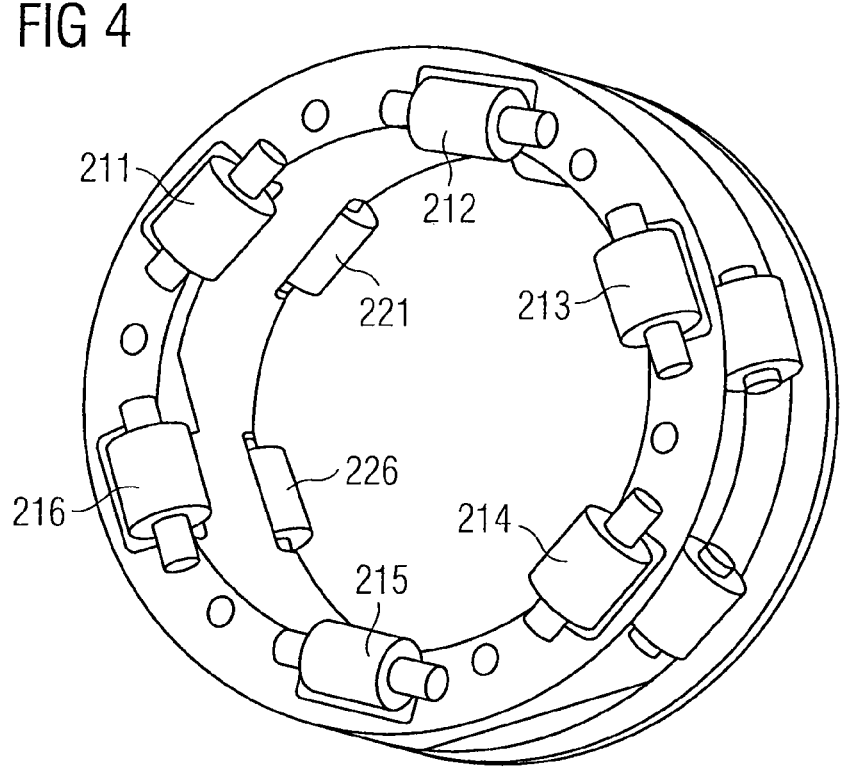
FIG. 4 shows a sectional representation of one embodiment of a guide element.

FIG. 4 shows a sectional representation of the guide element from FIG. 3. The section is taken at the height of the first row of rollers 211 to 216 so that the first row of rollers 211 to 216 are shown. Each of the first row of rollers 211 to 216 and the second row of rollers 221 to 226 has a cylindrical form, with a short section of smaller diameter connecting to both ends of the cylinder. The short sections are used for fixing within the guide element 1. During the fixing process, a play is provided so that the plurality of rollers 211 to 216 and/or 221 to 226 may rotate. The respective cylinder comes into contact with a passed-through corrugated tube. In one embodiment the guide element 1 is configured for a type of corrugated tube to be employed, such that only some or all of the plurality of rollers 211 to 216 and/or 221 to 226 come into contact with the corrugated tube. This configuration provides guidance of the corrugated tube in addition to minimal friction.

In one embodiment, the second row rollers 221 to 226 are arranged in parallel with the first row rollers 211 to 216 and are similarly fixed.

The wear and tear usually apparent on the corrugated tube with a sliding contact may be reduced. The service life of the corrugated tube consequently increases.

Less friction also results in lower forces in the overall cable harness with a corresponding effect on the mechanical loads of the connected modules (e.g., the C-arm, a cable store, the cable). This has a positive effect on the useful life of the affected elements. The accuracy of the acceptance may also be improved, since a more minimal force effect on the C-arm results in a smaller deformation and thus in less deviation from the ideal contour.

The present embodiments are not restricted to the case illustrated. The present embodiments may also be used outside the field of medicine, for example, within automation technology or robotics.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A system comprising:
    a flexible corrugated tube including grooves essentially transverse to an axis along the length of the flexible corrugated tube; and
    a guide element for the flexible corrugated tube, the guide element comprising:
        a ring; and
        a rotating roller that is integrated in the interior of the ring such that the rotating roller contacts the essentially transverse grooves of the flexible corrugated tube when the flexible corrugated tube is passed through the ring,
    wherein the rotating roller rotates with a movement of the flexible corrugated tube using the guide element.

2. The system as claimed in claim 1, wherein the guide element further comprises a plurality of rollers that is arranged along a periphery of the interior of the guide element, the plurality of rollers comprising the rotating roller.

3. The system as claimed in claim 2, wherein the plurality of rollers comprises three to six rollers arranged along the periphery of the interior of the guide element.

4. The system as claimed in claim 3, wherein the guide element in a passage direction of the flexible corrugated tube has a length that is a function of the diameter of one roller of the plurality of rollers, and
    wherein a plurality of rows of rollers is arranged along a periphery of the interior of the guide element.

5. The system as claimed in claim 3, wherein only the plurality of rollers come into contact with the flexible corrugated tube.

6. The system as claimed in claim 4, wherein only the plurality of rollers come into contact with the flexible corrugated tube.

7. The system as claimed in claim 2, wherein only the plurality of rollers come into contact with the flexible corrugated tube.

* * * * *